United States Patent
Cabrera (10) Patent No.: US 7,334,006 B1
(45) Date of Patent: Feb. 19, 2008

(54) OFF-LINE SUPPORT FOR CUMULATIVE BACKUPS

(75) Inventor: Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 191 days.

(21) Appl. No.: 09/670,760

(22) Filed: Sep. 27, 2000

(51) Int. Cl.
*G06F 17/30* (2006.01)

(52) U.S. Cl. ........................ 707/204; 707/202; 707/204

(58) Field of Classification Search ................ 707/200, 707/202–204, 3, 10
See application file for complete search history.

(56) References Cited

U.S. PATENT DOCUMENTS

| | | | | |
|---|---|---|---|---|
| 4,775,976 A * | 10/1988 | Yokoyama | ...................... | 714/4 |
| 5,495,607 A * | 2/1996 | Pisello et al. | ................... | 707/10 |
| 5,604,862 A * | 2/1997 | Midgely et al. | ................ | 714/6 |
| 5,822,771 A * | 10/1998 | Akiyama et al. | ............ | 711/162 |
| 5,835,953 A * | 11/1998 | Ohran | ........................ | 711/162 |
| 5,857,203 A * | 1/1999 | Kauffman et al. | ........... | 707/200 |
| 5,956,489 A * | 9/1999 | San Andres et al. | ......... | 709/221 |
| 6,029,179 A * | 2/2000 | Kishi | .......................... | 707/202 |
| 6,035,412 A * | 3/2000 | Tamer et al. | ................... | 714/6 |
| 6,038,379 A * | 3/2000 | Fletcher et al. | ........... | 395/200.6 |
| 6,047,294 A * | 4/2000 | Deshayes et al. | ............ | 707/204 |
| 6,073,128 A * | 6/2000 | Pongracz et al. | .............. | 707/3 |
| 6,073,222 A * | 6/2000 | Ohran | ........................ | 711/162 |
| 6,141,773 A * | 10/2000 | St. Pierre et al. | .............. | 714/20 |
| 6,145,088 A * | 11/2000 | Stevens | .......................... | 714/2 |
| 6,154,852 A * | 11/2000 | Amundson et al. | ............ | 714/5 |
| 6,360,330 B1 * | 3/2002 | Mutalik et al. | ................. | 714/4 |
| 6,477,591 B1 * | 11/2002 | VanderSpek | ................. | 710/38 |
| 6,487,561 B1 * | 11/2002 | Ofek et al. | .................. | 707/204 |
| 6,647,399 B2 * | 11/2003 | Zaremba | ..................... | 707/204 |
| 6,675,177 B1 * | 1/2004 | Webb | ......................... | 707/200 |

* cited by examiner

*Primary Examiner*—Dong Wong
*Assistant Examiner*—Hanh Thai
(74) *Attorney, Agent, or Firm*—Woodcock Washburn LLP

(57) ABSTRACT

A technique is provided to restore a target object such as a volume, directory or a pre-defined collection of files to a particular time by restoring the last full backup embodying the backup target, the last computed cumulative backup embodying the backup target and possibly the incremental backups after the last computed cumulative backup, if there are any that relate to change in the backup target. Restore operations in a bounded amount of time are accommodated by effectively managing the generation of full, incremental and cumulative backup files. Advantageously, the technique may be performed off-line for the analysis, collection and management of backup file subsets for different types of restore operations. Aspects of system restore operations are monitored and analyzed so that in response, off-line management and selection of efficient sets of backup files can be performed to correct inefficiencies that may be detected and to efficiently tailor restore operations to the system characteristics and patterns. If an application has a condition of bounded restore time, a set of cumulative backups may be efficiently tailored to meet the condition of bounded restore time.

32 Claims, 6 Drawing Sheets

FIG. 1A

*Prior Art*

FIG. 1B

*Prior Art*

FIG. 1C

| | |
|---|---|
| t1 | F1 |
| t2 | F2 |
| t3 | F1_I1 |
| t4 | F2_I1 |
| t5 | F1_I2 |
| t6 | F2_I2 |
| t7 | F1_I3 |
| t8 | F2_I3 |
| t9 | F1_I4 |
| t10 | F2_I4 |
| t11 | F1_I5 |
| t12 | F2_I5 |
| t13 | F1_I6 |
| t14 | F2_I6 |
| t15 | F1_I7 |
| t16 | F2_I7 |

*Prior Art*

FIG. 1D

| | |
|---|---|
| t1 | F1 |
| t2 | F1_I1 |
| t3 | F1_I2 |
| t4 | F1_I3 |
| t5 | F1_I4 |
| t6 | F1_CT6 |
| t7 | F1_CT6_I1 |
| t8 | F1_CT6_I2 |

*Prior Art*

OFF-LINE SUPPORT FOR CUMULATIVE BACKUPS

FIELD OF THE INVENTION

The present invention relates to computer system backups and, more particularly, to a networked computer system environment in which efficient backup techniques may be used off-line.

BACKGROUND OF THE INVENTION

An incremental backup system can generally be described as a system in which initially, a full backup is performed, and subsequently only changes relative to the full backup are stored. The full backup can be periodically updated, generally by adding the incremental change files to the previous full backup. Some systems may even keep track of two or three full backups e.g., on a rolling or circular buffering basis.

Figure 1A:
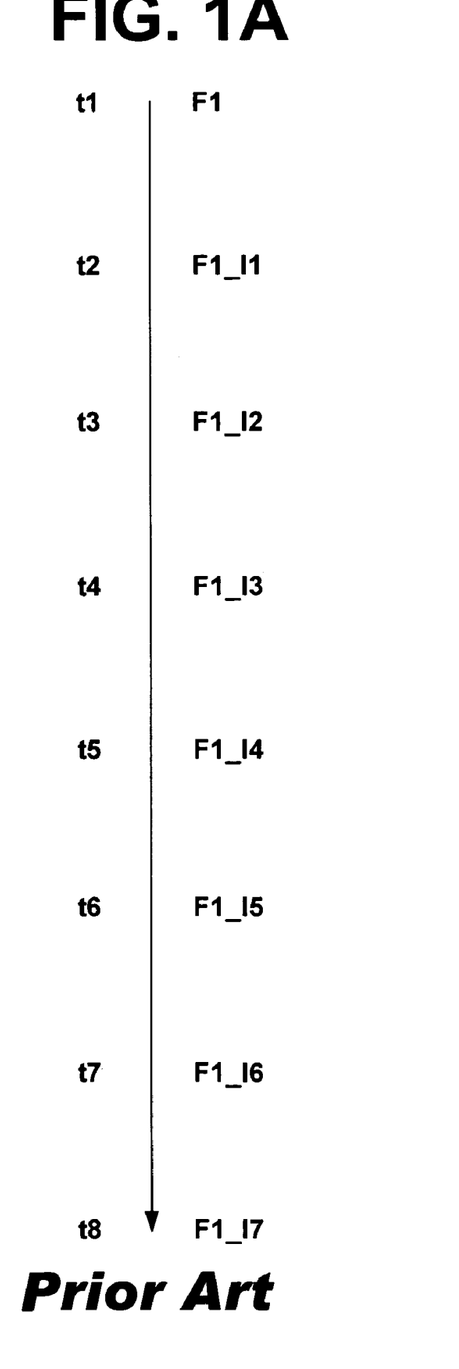
FIGS. 1A through 1D are temporal diagrams representing prior art on-line backup techniques.

For example, as shown in FIG. 1A, at t1, a full backup F1 of a system, disk, volume, or other collection of objects is performed. Restoring the system to the data stored in F1 reproduces the system conditions at t1. At t2, a full backup is unnecessary due to the likelihood that most of the data has not changed. Accordingly, an incremental or partial backup F1_I1 is performed, whereby typically only 'changed' portions of the backup target are recorded, so that the addition of F1 and F1_I1 produces the information for a system backup to time t2. Similarly, at t3, another incremental backup F1_I2 is performed that represents the change from t2 to t3. Accordingly, the addition of F1, F1_I1 and F1_I2 produces the information for a system backup to t3, and the process of producing additional incremental backups may continue indefinitely.

Figure 1B:
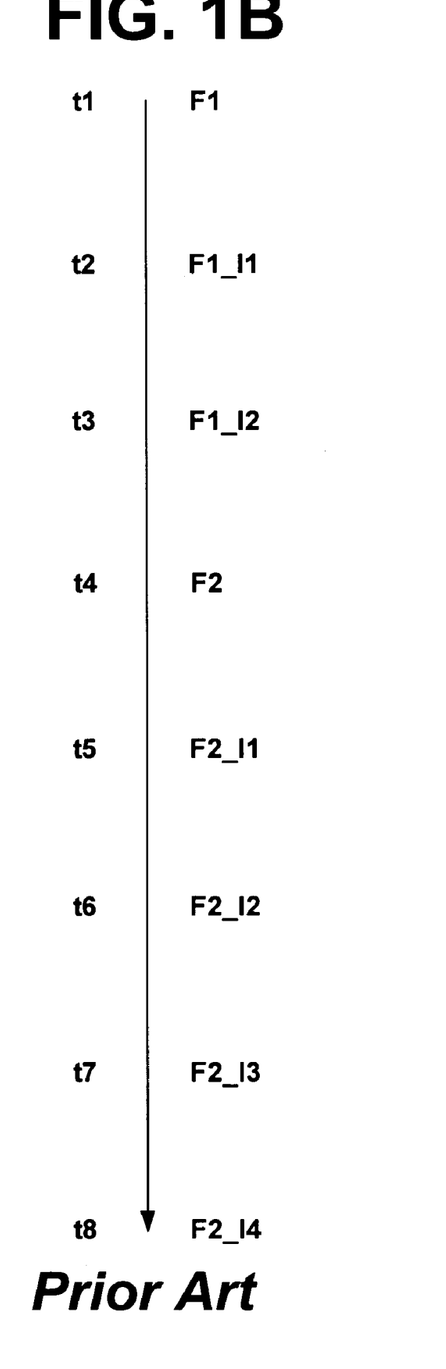

As shown in FIG. 1B, another full backup F2 can be performed, e.g., at t4, and subsequently incremental backups F2_I1, F2_I2, etc. for corresponding full backup F2 may be produced. The incremental backups F2_I1, F2_I2, and so on represent change to the backup target since full backup F2. Thus, as compared to FIG. 1A, the computer system performing full backups F1 and F2 can restore to, e.g., t5, more easily. In FIG. 1A, the addition of F1, F1_I1, F1_I2, F1_I3 and F1_I4 produces the information for a system backup to t5, whereas for FIG. 1B, only F2 and F2_I1 need be processed.

Figure 1C:
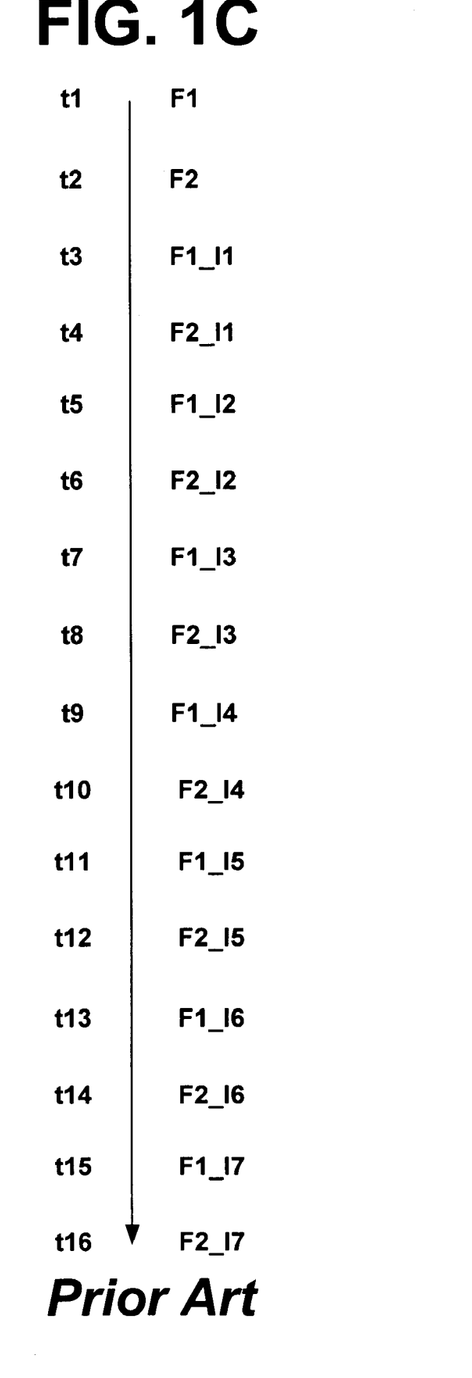
Figure 1D:
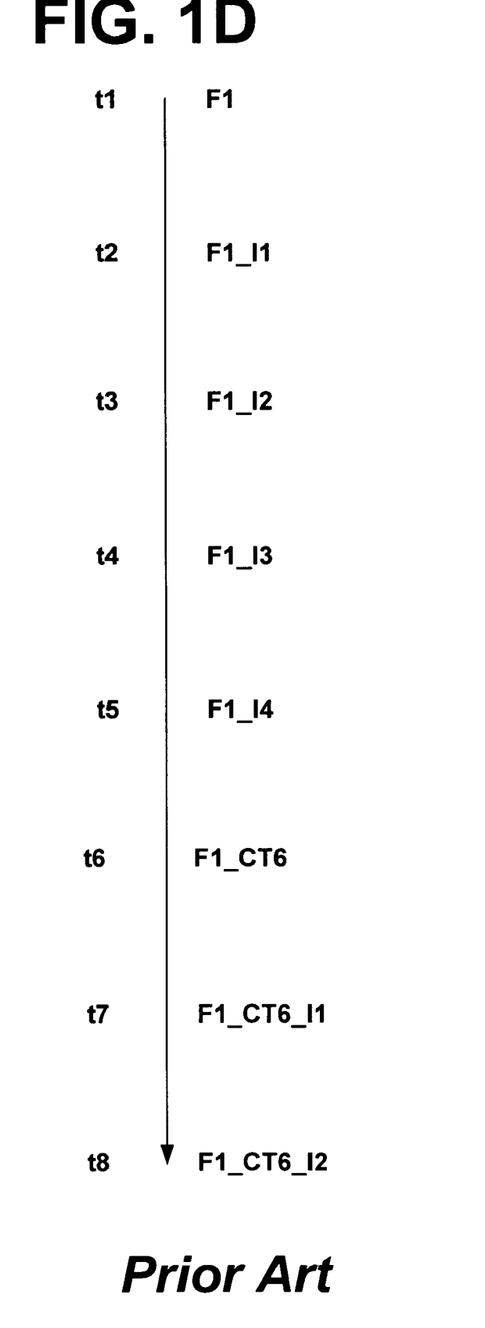

Furthermore, as shown in FIG. 1C, multiple full backup/incremental processes can be run simultaneously. After full backups F1 and F2, incremental backup files may be produced for both F1 and F2 separately, and F1 and F2 may have different files, volumes, etc. as the target for backup. Still further simplifying potential backup calculations and operations is the cumulative incremental calculation to a particular time. FIG. 1D illustrates a cumulative to time N (CTN) calculation in the context of FIG. 1A. For example, in FIG. 1A, to produce a snapshot of t8, an addition of F1_I1, F1_I2, F1_I3, F1_I4, F1_I5, F1_I6 and F1_I7 is performed for a system backup. Since eventually the number of incremental calculations and subsequent additions to produce a snapshot at time N may become inefficient or unmanageable, a cumulative backup may be computed to a time N.

In FIG. 1D, a cumulative backup for an entire system to time t6 (denoted F1_CT6) is calculated representing or embodying the change of incrementals F1_I1, F1_I2, F1_I3, F1_I4 from F1 and any change occurring from t5 to t6 as well. Thus, to compute a backup of the entire system to time t6, F1 and F1_CT6 are processed or added, eliminating the need to process the individual incrementals such as F1_I1, F1_I2, F1_I3, F1_I4 and F1_I5. To produce such a cumulative backup to a time t6, e.g., prior art techniques have examined the change of the target backup object from the time of a recent full backup to the target time for the cumulative backup. This is a comparison of the state of the system at the time of the full backup to the state of the system at the time of the cumulative backup. Thus, to produce a cumulative backup file, prior art techniques in essence produce an additional or separate incremental file for a time interval, measured from the full backup, that is greater than the time interval for a typical incremental file.

However, with respect to these types of incremental backup systems, a problem exists whereby particular kinds of restore operations may not require a processing a full backup including each and every incremental backup file. In essence, processing a full backup including each and every incremental backup file is computer resource intensive, with corresponding burdensome time consumption i.e., it takes a long time to perform such a backup. For example, if only a word processing application crashes, files incidental to and dependent upon that application should be the subject of restoring. Furthermore, certain crashes may be recurring, and thus information about files incidental to these crashes is valuable and may be the source of efficient restore operations for these types of crashes. Additionally, there is redundancy of information from incremental file to incremental file that is not exploited when each incremental file is utilized in a restore process.

In response to these difficulties, a back end system with co-location keys was developed. A typical back end system administers a collection of tapes that sequentially store incremental backup files. By picking out a set of files unique to a particular restore operation from the collection of tapes, and co-locating them on a single tape, the files advantageously can be co-located on a single tape avoiding time and resource intensive searching, and allowing faster and more efficient restore operations. However, today's tape co-location techniques are implemented in conjunction with an on-line computer system in order to perform the operations incident to co-location tape generation, and significant advances in storage size and access have occurred since the development of current generations of backup systems. On-line resources are premium resources compared to off-line resources and storage solutions have proliferated since the days of tape backup storage. Consequently, computing resources are wasted to accommodate prior art techniques.

Thus, it would be desirable to provide a technique that provides off-line collection and management of backup file subsets for different types of restore operations. It would be further advantageous to input portion(s) of a system to which efficient backup techniques would be suited. It would be further advantageous to monitor and analyze aspects of system restore operations, so that inefficiencies resulting from existing system backup or restore operations may be detected and made more efficient through the use of cumulative backup techniques tailored to the inefficiency. It would also be beneficial to utilize information contained in incremental files to promote efficiency, such as through the retrospective analysis of such information to produce cumulative backup file(s).

SUMMARY OF THE INVENTION

This invention relates generally to computer systems that utilize an incremental backup system, wherein one full backup is followed by a sequence of successive incremental backups. The present invention provides a way to restore a target object such as a volume, directory or a pre-defined collection of files to a particular time by restoring the last full backup embodying the backup target, the last computed cumulative backup embodying the backup target and possibly the incremental backups after the last computed cumulative backup, if there are any that relate to change in the backup target. The invention may thus accommodate the restore operation in a bounded amount of time by effectively managing the generation of full, incremental and cumulative backup files. Advantageously, the technique may be performed off-line for the analysis, collection and management of backup file subsets for different types of restore operations. Aspects of system restore operations are monitored and analyzed so that in response, off-line management and selection of efficient sets of backup files can be performed to correct inefficiencies that may be detected and to efficiently tailor restore operations to the system characteristics and patterns. If an application has a condition of bounded restore time, the present invention may efficiently tailor a set of cumulative backups to meet the condition of bounded restore time.

Other features of the present invention are described below.

BRIEF DESCRIPTION OF THE DRAWINGS

The system and method for providing efficient off-line backup support to a computer system is further described with reference to the accompanying drawings in which.

DETAILED DESCRIPTION OF THE INVENTION

The present invention relates generally to computer systems that utilize an incremental backup system, wherein one full backup is followed by a sequence of successive incremental backups. Since prior art techniques utilize on-line production and maintenance of backup files, these techniques consume valuable on-line time and resources and do not flexibly accommodate unique system characteristics. The present invention provides a way to restore a volume, directory or a pre-defined collection of files to a time T1 in a bounded amount of time by restoring the last full backup, then the last computed cumulative backup and then the relatively small number of incremental backups after the last computed cumulative backup, if any. Further, a plurality of cumulative backups may be calculated to accommodate multiple subsets of backup files for different backup targets for different times.

In accordance with the present invention, advances in off-line processing power and storage are brought to the context of traditional backup or restore operations. A computed cumulative backup is obtained by combining, preferably off-line although the process can be conducted on-line if resources are available for doing so, the results of two or more consecutive incremental backups e.g., incremental backups occurring at times T1, T2, T3, T4, . . . TN, T(N+1). Then, a Cumulative backup to Time N (denoted CTN) is the result of combining all the modifications that were recorded from T1 to TN. The last version of each storage block is the one that is utilized in connection with a CTN calculation. The allocation map that describes CTN is the one present in TN, and the value of each of the allocated storage blocks that have changed since the last full backup is the last change present in the range T1 to TN. For instance, if an allocated storage block S1 of a target object is present in incremental backups T1, T5 and T7, where 7#N, then in the present example, the storage block information that will be utilized for CTN is the information from T7, because it is not necessary to predate T7. Thus, sessions are advantageously inspected from most recent to oldest to find the target set of files desired for the CTN. Hence, for a particular storage block, the CTN computation need only go as far backwards from time N as to capture the most recent version of the storage block as found in the most recent incremental backup containing that storage block.

While these computations may be performed while a computer system is on-line, in accordance with the present invention, beneficially these computed cumulative backups also can be achieved off-line.

Thus, in accordance with the present invention, if the last incremental backup is TN, and CTN has been produced, then the restore of the volume to time N is achieved by first restoring the full backup and then restoring the CTN backup. This eliminates the reproduction of multiple incremental backups that may contain redundant information. Any writes to the volume occurring after time N, if any, are captured in incremental backups T(N+1), T(N+2), etc. Thus, if called for, these incremental backups may be included after the CTN backup is added to the full backup or a new CTN calculation can be determined for any of CT(N+1), CT(N+2), etc. The CTN backup calculation and its addition to the full backup can also be made off-line to produce a complete image of the volume or target object at time N.

Figure 2:
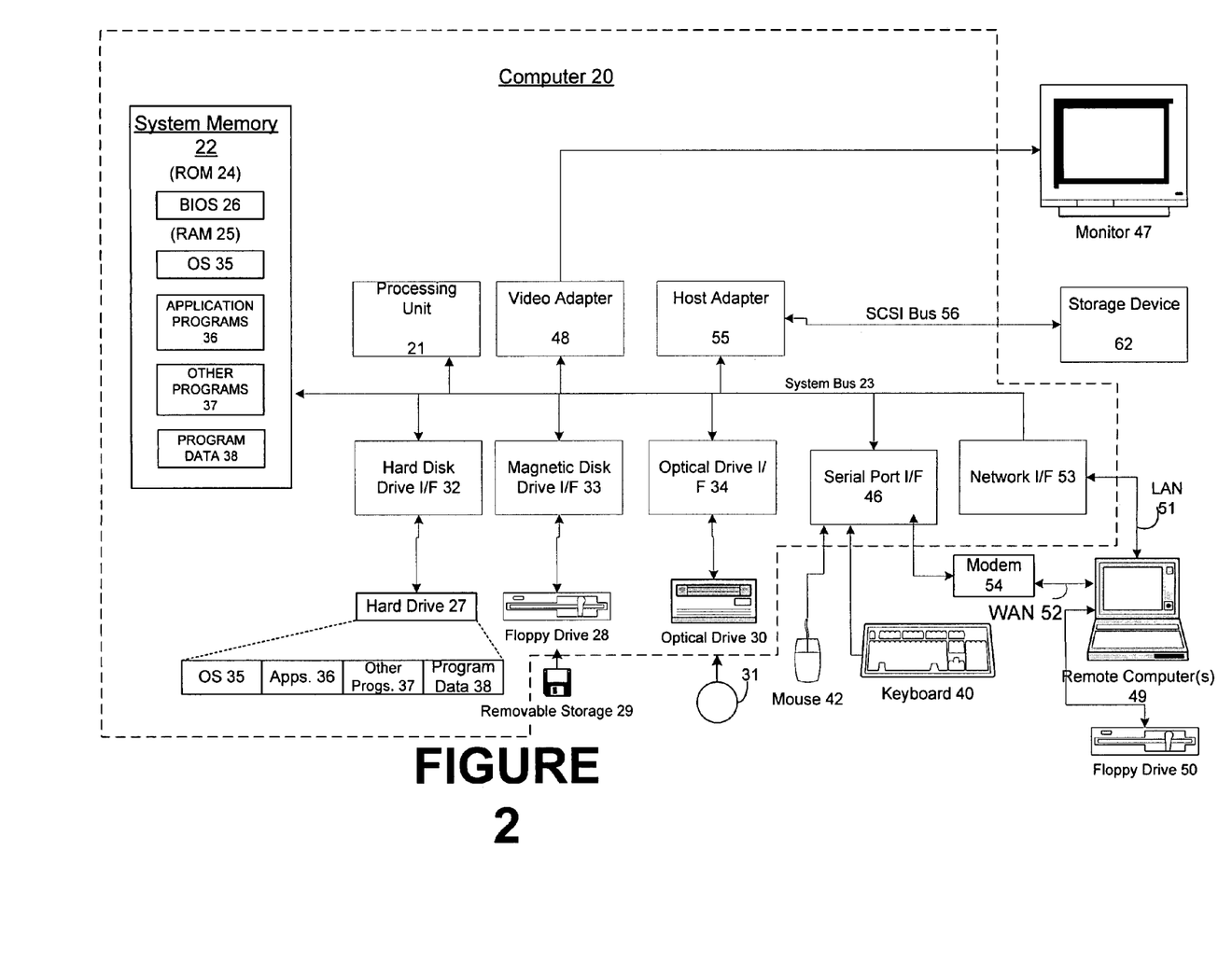
FIG. 2 is a block diagram representing a general purpose computer in which aspects of the present invention may be incorporated.

FIG. 2 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3:
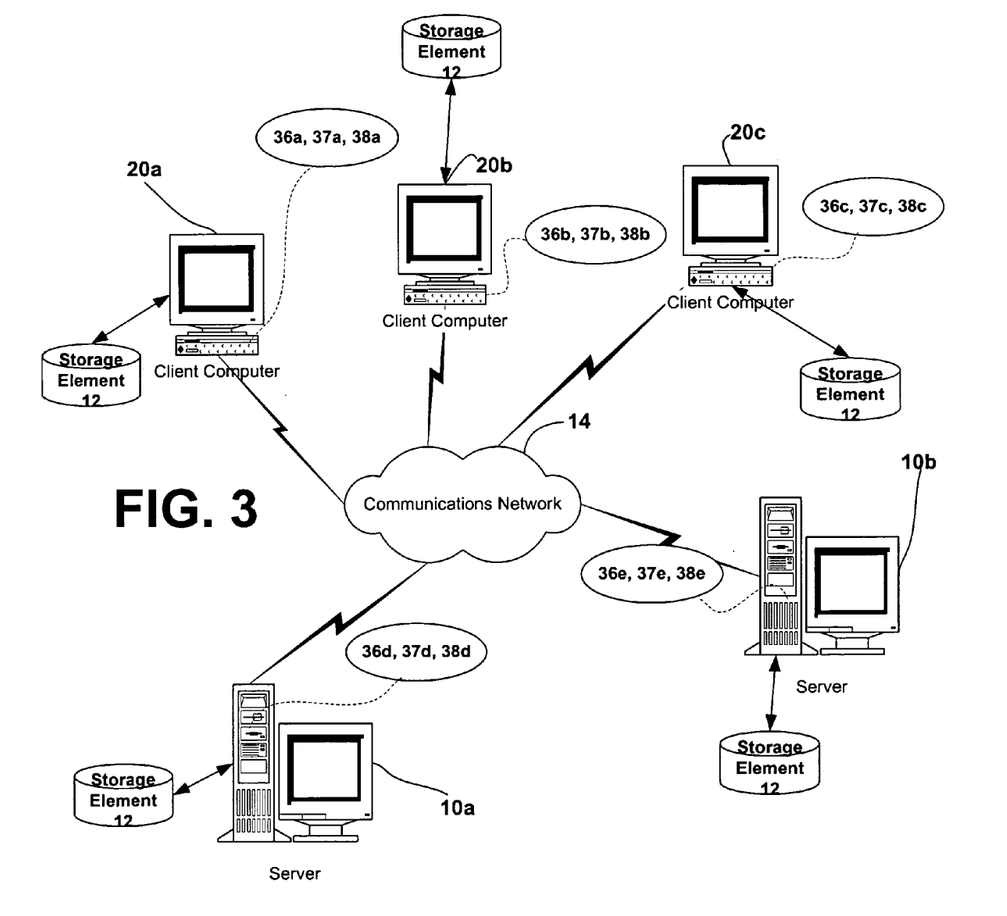
FIG. 3 is a block diagram representing an exemplary network environment with clients, servers and storage components in connection with which the present invention may be implemented.

The computer described above can be deployed as part of a computer network connected to remote or local storage components, and the present invention pertains to any computer system having any number of memory or storage units, and any number of applications and processes occurring across any number of volumes. Thus, the present invention may apply to both server computers and client computers deployed in a network environment, having remote or local storage. FIG. 3 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 20a, 20b, 20c, etc. In a network environment in which the communications network 14 is the Internet, for example, the servers 10 can be Web servers with which the clients 20 communicate via any of a number of known protocols such as hypertext transfer protocol (HTTP). Storage components 12 may be located anywhere in the system and may be used for remote, local, on-line or off-line storage of full, incremental and cumulative backup files for a target object of the computer system.

For explanatory purposes, a storage volume is a software abstraction of the underlying storage devices and is the smallest self-contained unit of storage mounted by an operating system and administered by the file system. Storage volumes abstract the physical topology of their associated storage devices and may be a fraction of a disk, a whole disk or even multiple disks that are bound into a virtually contiguous range of logical blocks. In today's complex computer system environments, storage volumes can be a diverse set of elements for which efficient and effective management is desirable. Volumes are constructed from one or more extents that are contiguous storage address spaces presented by the underlying storage devices. An extent is typically characterized by the size of the address space and a starting offset for the address space from a base of the media.

As used herein, target object refers to a set of data objects for which backup data to particular time(s) is desirable. The target object may include an entire volume, multiple volumes, a portion of a volume, the entire system, portions located across multiple volumes, portions located across network(s). In essence, a target object in accordance with the present invention is any data stored anywhere for which a backup to an atomic point in time is desirable.

Thus, each client computer 20 and server computer 10 may be equipped with various application program modules 36, other program modules 37 and program data 38, and with connections or access to various types of storage elements or objects 12. The present invention can be utilized in a computer network environment having client computers for accessing and interacting with the network and a server computer for interacting with client computers. As mentioned previously, in accordance with the present invention, a volume, directory or a pre-defined collection of files (a target object) is restored to a time T1 in a bounded amount of time by restoring the last full backup, then the last computed cumulative backup and then the relatively small number of incremental backups after the last computed cumulative backup, if any. The target object may be defined by a user or determined according to rules or an intelligent analysis of system characteristics. Further, a plurality of cumulative backups may be calculated to accommodate multiple subsets of backup files for different backup target objects for different times.

Figure 4:
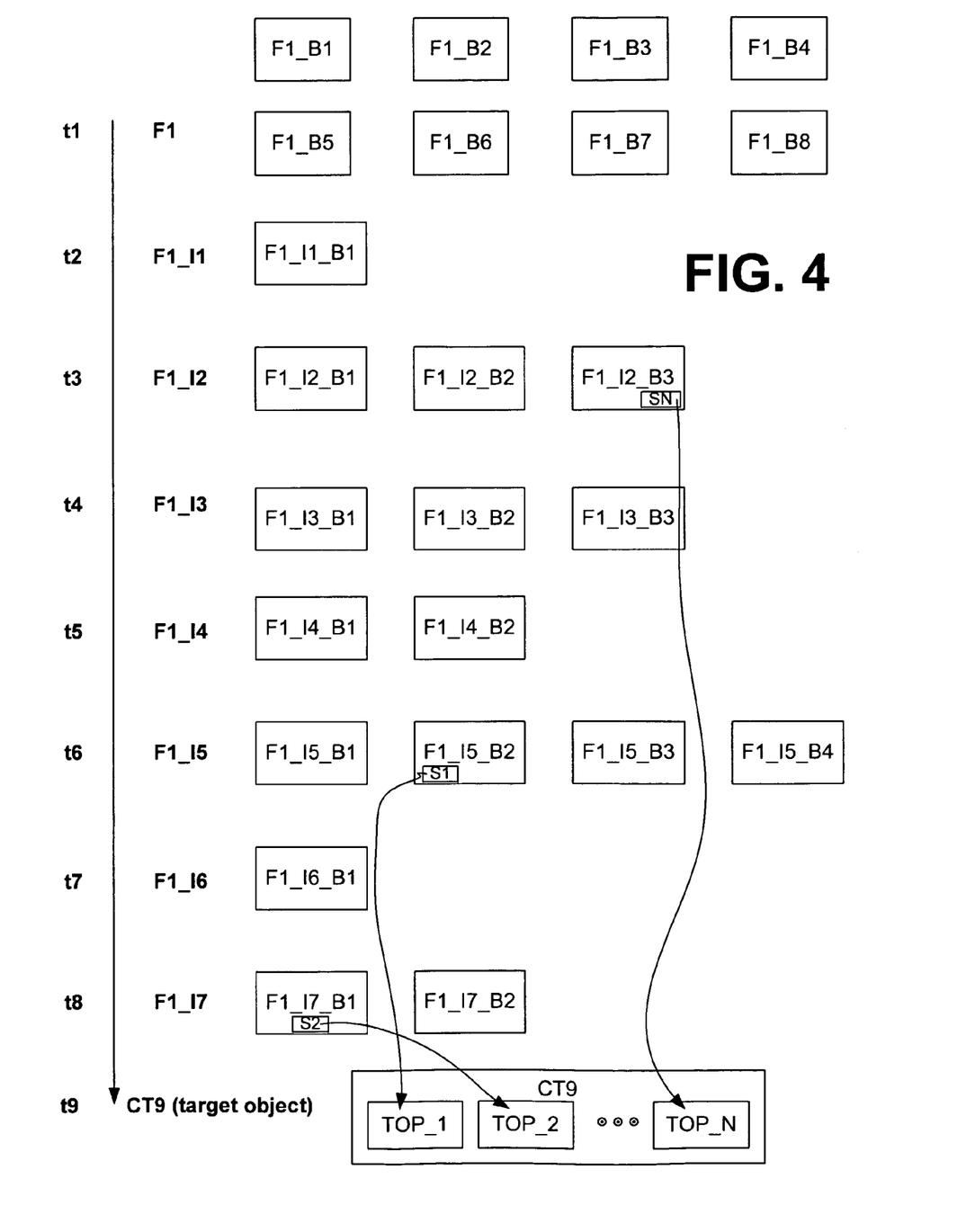
FIG. 4 is an illustration of the co-location of storage blocks of a target object to create a cumulative efficient backup object.

FIG. 4 is an illustration of the co-location of storage blocks of a target object to create a cumulative efficient backup object. It should be noted that backup, incremental and cumulative files are stored in memory blocks of a storage component 12 wherever located in the network. Accordingly, since some changes during a time interval may be more sweeping than for other time intervals, more or less blocks B1, B2, B3, etc. will be implicated. Thus, in the example of FIG. 4, a full backup file F1 is stored across eight memory blocks F1_B1 through F1_B8. The first incremental file F1_I1 at t2 is stored in one block F1_I1_B1, the second incremental file F1_I2 at t3 is stored across three blocks F1_I2_B1, F1_I2_B2 and F1_I2_B3, and so on. In accordance with the present invention, for a given target object, a cumulative file at a particular time may be created so that resource intensive searching through incremental files for the data necessary to restore a target object can be avoided at the time of restore, thereby significantly reducing the overall time needed to restore a target object from the time of its failure or corruption.

For example, it may be desirable to restore a target object, such as a word processing application and all of its dependent applications or objects, to a time t9. In accordance with the present invention, off-line (or on-line) calculation may be made wherein a file CT9 is created that represents the change of a target object from a full backup F1 to time t9. Accordingly if the word processing application crashes or is corrupted, a restore operation may be made from CT9 in connection with F1. Because CT9 contains the storage block mapping information of the target object, only the storage blocks of the target object need be restored during the processing of F1 and CT9, thereby eliminating any restoring other than the target object.

Thus, in the example of FIG. 4, if a target object had N storage blocks for restore purposes, and if the Nth storage block SN changed at time t3, the first storage block S1 changed at t6 and the second storage block changed at t8, a cumulative backup file for time t9 may be generated as follows. In an order from most recent to oldest (from t9 to t1), change of the target storage blocks S1, S2 . . . SN is analyzed. When the last storage block for which change has occurred is discovered, the analysis is complete and the generation of CT9 may be achieved.

In the example, first the most recent change in S2 is discovered in F1_I7_B1 and copied into the second target object portion TOP_2. Then, the most recent change in S1 is discovered in F1_I5_B2 and copied into the first target object portion TOP_1. And so on, until the most recent change of the last storage block, SN, is discovered in F1_I2_B3 and copied into the last object portion TOP_N. No particular order of the storage blocks S1 to SN of the target object is necessary as long as all of the change of the target object is captured in the cumulative target object backup file. Thus, once CT9 has been generated, preferably off-line, and since CT9 includes the storage block mappings and the most recent change for the target object relative to the full backup file F1, a target object restore operation to t9 is simplified and streamlined having been tailored to the target object. Any incremental changes occurring subsequent to CT9, if any, would also be accommodated by a restore operation to a time subsequent to t9.

In a presently preferred embodiment, CTN files are stored in Microsoft tape format (MTF), although any format suited to the storage of a cumulative backup file may be used. In MTF, a collection of files backed up from a hard drive are stored on tape as a data set, and there may be multiple data sets per tape. Data sets may span one or more tapes. The term tape family refers to a collection of one or more data sets appended together and spanning one or more tapes. In MTF, there are three main components: a tape data block, otherwise known as the tape header, one or more data sets, and on tape catalog information. MTF tape contains a tape descriptor block. The tape descriptor block is the first object on the tape and serves to identify the tape. In order to accomplish this it contains the following: a unique tape Family ID, a tape sequence number indicating to which family the tape belongs, the date the tape was added to its family, and the tape name and description.

Figure 5:
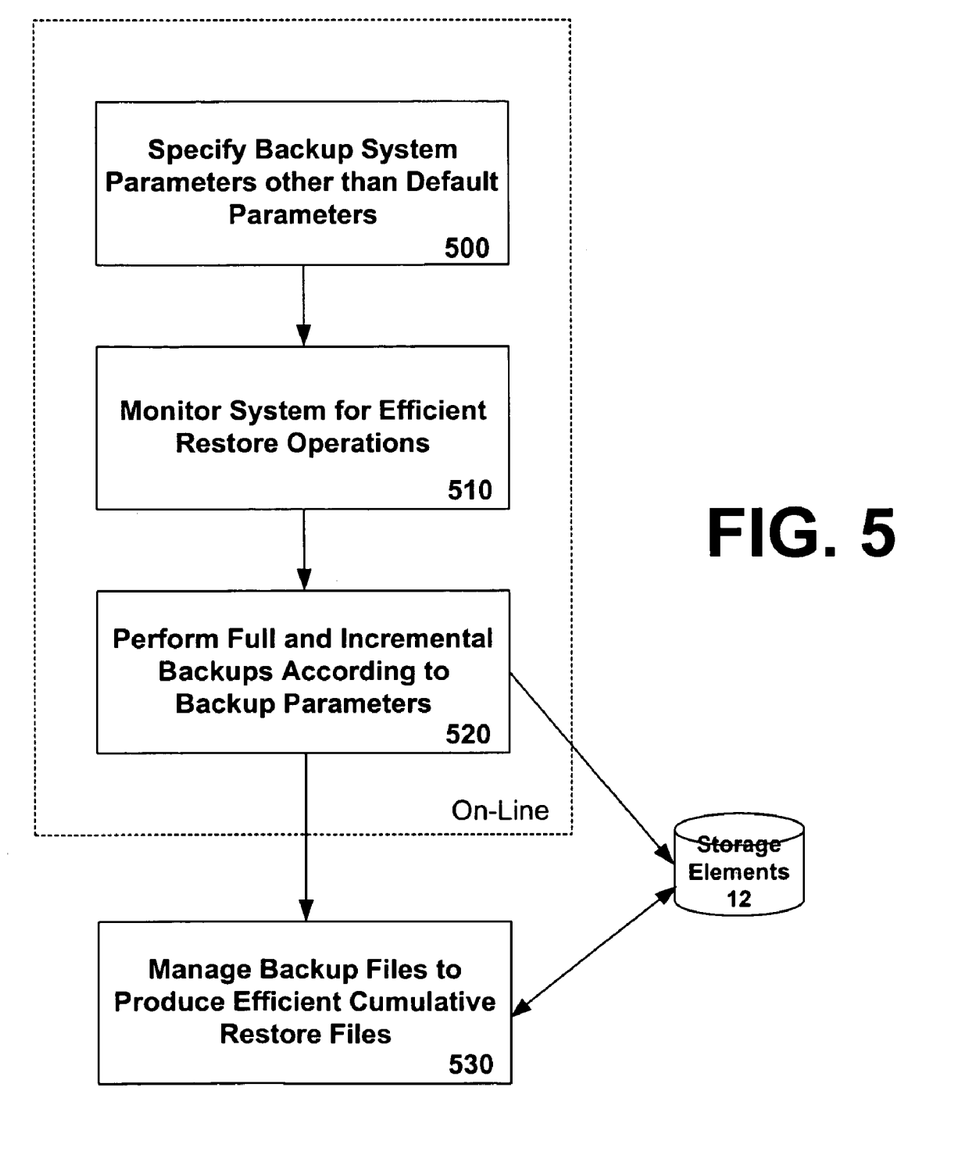
FIG. 5 illustrates an exemplary flow description illustrating aspects of the efficient restore techniques of the present invention.

FIG. 5 illustrates an exemplary flow description of the present invention showing further advantage achieved by controlling backup and restore processes to correct system inefficiency or to meet a system condition such as a bounded restore time. Step 500 is included to illustrate that a user may specify a target object and/or other parameters such as frequency of or conditions for cumulative backup calculations. This is advantageous because a user may be in the best position to determine the importance of or characteristics for a target object backup. Multiple procedures according to different priorities may be specified. However, there may also be default parameters for the system backup processes to follow, which may also be altered. As step 510 illustrates, a system may also be configured to analyze itself for what may be efficient generation of backup files or a good candidate for a target object. For example, a particular application may repeatedly crash when X, Y and Z conditions occur, and if so, the system could generate a rule wherein cumulative backup operations are tied to the times when X, Y and/or Z occur. According to the parameters/rules, either system or user specified, for the generation of full and incremental backup files at various times and under various conditions, at 520, the files are generated and stored preferably in off-line storage components 12. Once stored off-line, efficient management of the data may be effected whereby the cumulative backup files for a target object in accordance with the present invention are created (See e.g., FIG. 4). As mentioned in connection with 500 and 510, these target objects may be specified by a user or determined according to system analysis. In this fashion, efficient backup procedures for target objects are implemented.

As suggested above, the frequency of cumulative backup calculations is a policy that supports the notion of bounded restore time. If it is known that there is an upper limit for restore operations, the frequency of cumulative backups may be controlled accordingly to bound the total restore time. As a general rule, the more cumulative backups that exist in accordance with the present invention, the shorter the time it will take to perform restore operations because CTN calculations generally contain greater informational value than an incremental backup. It should also be noted that more than one cumulative backup may be computed as part of the same request i.e., incremental backups may be examined for applicability to multiple cumulative backups having different criteria associated therewith. Lastly, a user may be in the best position to judge restore characteristics that may be beneficial to a particular computer system. The present invention thus provides the user with the flexibility to define valuable restore operations for which cumulative backups would streamline the restore process.

The various techniques described herein may be implemented with hardware or software, where appropriate, or with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques of the present invention may invariably be a combination of hardware and software to be utilized in connection with storing system data.

While the present invention has been described in connection with the preferred embodiments of the various figures, it is to be understood that other similar embodiments may be used or modifications and additions may be made to the described embodiment for performing the same function of the present invention without deviating therefrom. For example, while in a preferred embodiment, Microsoft tape format (MTF) is the format used in connection with the generation of backup files and performance of restore operations, any format may be accommodated. It should be understood that many different communications and network protocols may be suited to the delivery of backup information in accordance with the present invention. Furthermore, it should be emphasized that a variety of computer platforms, including handheld device operating systems and other application specific operating systems are contemplated for use in connection with the backup techniques of the present invention. Therefore, the present invention should not be limited to any single embodiment, but rather construed in breadth and scope in accordance with the appended claims.

What is claimed is:

1. A method for generating backup files in a computer system comprising:

generating a full backup file corresponding to a first time for a set of objects in the computer system;

generating at least one incremental file for said set of objects after said first time, wherein each of said at least one incremental file is associated with the set of objects;

identifying a target object within said set of objects for the generation of cumulative backup files; and generating at least one cumulative backup file corresponding to a second time, after said first time, for said target object, wherein said generating of said at least one cumulative backup file is performed off-line and from calculations with only said generated full back up file and said generated at least one incremental file and not comparison with the set of objects, wherein said at least one cumulative backup file corresponding to a second time allows for the restoration of the target object without the restoration of the set of objects.

2. A method for generating backup files according to claim 1, wherein said generating of said at least one cumulative backup file includes analyzing at least one incremental file generated between said first and second time.

3. A method for generating backup files according to claim 2, wherein said analyzing of said at least one incremental file is performed in reverse chronological order, starting from said second time.

4. A method for generating backup files according to claim 1, further comprising restoring said target object to said second time by processing said full backup file and said at least one cumulative backup file.

5. A method for generating backup files according to claim 1, further comprising restoring said target object to a third time later than said second time by processing a full backup file, said at least one cumulative backup file and any incremental backup files generated between said second time and said third time.

6. A method for generating backup files according to claim 1, wherein said identifying includes identifying a related subset of files as said target object for a cumulative backup file.

7. A method for generating backup files according to claim 1, wherein said identifying includes identifying a volume as said target object for a cumulative backup file.

8. A method for generating backup files according to claim 1, wherein said identifying includes identifying a directory as said target object for a cumulative backup file.

9. A method for generating backup files according to claim 1, wherein a user identifies the target object.

10. A method for generating backup files according to claim 1, further comprising monitoring and analyzing restore operations in said computer system, wherein said target object is identified in response to said monitoring and analyzing.

11. A method for generating backup files according to claim 1, wherein said identifying of said target object is designed to meet a condition of bounded restore time for said target object.

12. A method for generating backup files according to claim 1, further comprising controlling the frequency of generating at least one of a full, incremental and cumulative backup.

13. A computer-readable medium having computer-executable instructions for instructing a client computer to perform the method of claim 1.

14. A data structure stored in a computer readable medium for representing cumulative backup information for a target object generated according to the method of claim 1, comprising:
- storage block mappings for said target object; and
- cumulative backup data representative of change of the target object relative to a full backup wherein said data representative of said change is stored in the format of Microsoft tape format.

15. A method for generating backup files in a computer system, comprising:
- generating a full backup file corresponding to a first time for a set of objects in the computer system;
- generating at least one incremental file for said set of objects after said first time, wherein each of said at least one incremental file is associated with the set of objects;
- identifying a target object within said set of objects for the generation of cumulative backup files; and
- generating at least one cumulative backup file corresponding to a second time, after said first time, for said target object from calculations with only at said generated full back up file and said generated at least one incremental file and not comparison with the set of objects, wherein said generating of said at least one cumulative backup file includes analyzing at least one incremental file generated between said first and second time, wherein said at least one cumulative backup file corresponding to a second time allows for the restoration of the target object without the restoration of the set of objects.

16. A method for generating backup files according to claim 15, wherein said analyzing of said at least one incremental file is performed in reverse chronological order, starting from said second time.

17. A method for generating backup files according to claim 15, wherein said generating of said at least one cumulative backup file is performed off-line.

18. A method for generating backup files according to claim 15, further comprising monitoring and analyzing restore operations in said computer system, wherein said target object is identified in response to said monitoring and analyzing.

19. A method for generating backup files according to claim 15, wherein said identifying of said target object is designed to meet a condition of bounded restore time for said target object.

20. A method for generating backup files according to claim 15, further comprising controlling the frequency of generating at least one of a full, incremental and cumulative backup.

21. A computer-readable medium having computer-executable instructions for instructing a client computer to perform the method of claim 15.

22. A computer system, comprising:
- a plurality of servers having at least one connection to a communications network; and
- a plurality of storage components for the storage of backup information for a plurality of target objects in the form of full, incremental and cumulative backup information, wherein the full and incremental backup information is associated with the collection of said plurality of target objects;
- wherein said cumulative backup information is generated off-line for a target object of the plurality of target objects based only at most on the full and incremental backup information associated with the collection of said plurality of target objects and not by comparison with the plurality of target objects, and wherein said storage components are accessible over said at least one connection via said plurality of servers, further wherein said cumulative backup information allows for the restoration of the target object without the restoration of the collection of said plurality of target objects.

23. A computer system according to claim 22, wherein the target object is reconstructed by processing at least one cumulative backup file of the cumulative backup information associated with said target object and a full backup file associated with the collection of said plurality of target objects.

24. A computer system according to claim 22, wherein said plurality of storage components store backup information for said target object according to a user specification as to which subset of files comprises said target object.

25. A computer system according to claim 22, wherein said plurality of storage components store backup information for a volume as said target object.

26. A computer system according to claim 22, wherein said plurality of storage components store backup information for a directory as said target object.

27. A computer system according to claim 22, wherein at least one of said plurality of servers generates said backup information in response to monitoring and analyzing an inefficiency of a system restore operation.

28. A computer system according to claim 22, wherein the generation of backup information is designed to meet a condition of bounded restore time for the target object.

29. A computer system according to claim 22, wherein the generation of a cumulative backup file includes the analysis of at least one incremental file of the incremental backup information generated for the plurality of target objects.

30. A computer system according to claim 29, wherein said analysis of said at least one incremental file is performed in reverse chronological order.

31. A computer system, comprising:
- a plurality of servers having at least one connection to a communications network; and
- a plurality of storage components for the storage of backup information for a plurality of target objects in the form of full, incremental and cumulative backup information, wherein the full and incremental backup information is associated with the collection of said plurality of target objects;
- wherein said cumulative backup information is generated off-line for a target object of the plurality of target objects based on an analysis of the full and incremental backup information associated with the collection of said plurality of target objects and not by comparison with the plurality of target objects, and wherein said storage components are accessible over said at least one connection via said plurality of servers, further wherein said cumulative backup information allows for the restoration of the target object without the restoration of the collection of said plurality target objects.

32. A computer system according to claim 31, wherein said analysis includes an analysis of at least one incremental file of the incremental backup information performed in reverse chronological order.

* * * * *